| (12) | United States Patent<br>Jang et al. | (10) Patent No.: US 10,186,915 B2<br>(45) Date of Patent: Jan. 22, 2019 |
|---|---|---|

| (54) | BLDC MOTOR AND CLEANER HAVING THE SAME |
|---|---|
| (71) | Applicant: LG ELECTRONICS INC., Seoul (KR) |
| (72) | Inventors: Kwangyong Jang, Seoul (KR); Sangchul Lee, Seoul (KR); Kyunghoon Lee, Seoul (KR); Changhum Jo, Seoul (KR) |
| (73) | Assignee: LG ELECTRONICS INC., Seoul (KR) |
| ( * ) | Notice: Subject to any disclaimer, the term of this patent is extended or adjusted under 35 U.S.C. 154(b) by 552 days. |
| (21) | Appl. No.: 15/004,152 |
| (22) | Filed: Jan. 22, 2016 |
| (65) | Prior Publication Data<br>US 2016/0218570 A1    Jul. 28, 2016 |
| (30) | Foreign Application Priority Data<br>Jan. 22, 2015 (KR) .......... 10-2015-0010412 |
| (51) | Int. Cl.<br>*H02K 1/14*       (2006.01)<br>*H02K 21/14*      (2006.01)<br>(Continued) |
| (52) | U.S. Cl.<br>CPC ............. *H02K 1/146* (2013.01); *H02K 1/272* (2013.01); *H02K 9/06* (2013.01); *H02K 19/10* (2013.01);<br>(Continued) |
| (58) | Field of Classification Search<br>CPC .. H02K 1/06; H02K 1/08; H02K 1/14; H02K 1/146; H02K 1/16; H02K 1/165; H02K 21/14; H02K 21/16; H02K 2213/03<br>(Continued) |

(56) References Cited

U.S. PATENT DOCUMENTS

| 3,749,956 | A | * | 7/1973 | Reiss | ..................... | H02K 1/146<br>310/216.022 |
|---|---|---|---|---|---|---|
| 3,891,881 | A | * | 6/1975 | Harris | ...................... | H02K 1/08<br>29/609 |

(Continued)

FOREIGN PATENT DOCUMENTS

| EP | 2 312 727 | 4/2011 |
|---|---|---|
| FR | 2 844 112 | 3/2004 |

(Continued)

OTHER PUBLICATIONS

European Search Report dated Apr. 20, 2016 issued in Application No. 16152051.5.

*Primary Examiner* — Burton Mullins
(74) *Attorney, Agent, or Firm* — KED & Associates, LLP

(57) ABSTRACT

A Blushless Direct Current (BLDC) motor may include a motor housing; a stator including a stator core installed within the motor housing and a coil wound in the stator core and that generates a magnetic field by applied power; and a rotor disposed within the stator and in which a magnet that interacts with the magnetic field is installed and that rotates within the stator by an interaction with the magnetic field. The stator core may include a back yoke in which straight portions and curved portions are alternately formed; and teeth protruded from the back yoke toward the magnet. The tooth include a neck protruded from the back yoke, and a shoe protruded from the neck and separated from the magnet and that encloses at least a portion of the magnet. A ratio A/B of a width A of the neck to a width B of a shoe end portion is 2.5 to 3.5. By optimizing a ratio A/B of a width A of the neck to a width B of the shoe end portion constituting the stator core, efficiency of a BLDC motor may be maximized.

20 Claims, 4 Drawing Sheets

(51) Int. Cl.
    *H02K 1/27*        (2006.01)
    *H02K 19/10*      (2006.01)
    *H02K 21/16*      (2006.01)
    *H02K 9/06*        (2006.01)
    *H02K 7/14*        (2006.01)

(52) U.S. Cl.
    CPC ............. *H02K 21/16* (2013.01); *H02K 1/278* (2013.01); *H02K 7/14* (2013.01); *H02K 2213/03* (2013.01)

(58) Field of Classification Search
    USPC .................................. 310/216.097, 216.111
    See application file for complete search history.

(56) References Cited

U.S. PATENT DOCUMENTS

| | | | | |
|---|---|---|---|---|
| 4,719,382 A * | 1/1988 | Listing | ................... | H02K 23/42 |
| | | | | 310/177 |
| 5,250,867 A * | 10/1993 | Gizaw | ................... | H02K 21/16 |
| | | | | 310/156.12 |
| 6,104,117 A * | 8/2000 | Nakamura | ............. | H02K 1/148 |
| | | | | 310/156.45 |
| 6,882,080 B2 * | 4/2005 | Tanaka | ................... | H02K 1/148 |
| | | | | 310/216.112 |
| 7,141,905 B2 * | 11/2006 | Vollmer | ................. | H02K 1/146 |
| | | | | 310/216.112 |
| 9,013,083 B2 * | 4/2015 | Morita | ................... | H02K 1/146 |
| | | | | 310/156.23 |
| 9,157,424 B2 * | 10/2015 | Smith | ..................... | H02K 23/40 |
| 9,564,779 B2 * | 2/2017 | Nakano | ................ | H02K 21/16 |
| 2008/0290751 A1 * | 11/2008 | Hwang | ................. | H02K 1/146 |
| | | | | 310/156.01 |
| 2013/0169106 A1 | 7/2013 | Yokogawa et al. | | |
| 2016/0087498 A1 * | 3/2016 | Matsuoka | ............. | H02K 21/16 |
| | | | | 310/156.43 |
| 2016/0172949 A1 * | 6/2016 | Matsuoka | ............. | H02K 21/16 |
| | | | | 310/195 |

FOREIGN PATENT DOCUMENTS

| | | |
|---|---|---|
| JP | 2006-087222 | 3/2006 |
| JP | 2007-011455 | 1/2007 |
| JP | 2010-130839 | 6/2010 |
| KR | 10-0445378 | 8/2004 |
| KR | 10-0474341 B1 | 3/2005 |
| KR | 10-2011-0132012 | 12/2011 |

* cited by examiner

BLDC MOTOR AND CLEANER HAVING THE SAME

CROSS-REFERENCE TO RELATED APPLICATION(S)

This application claims priority under 35 U.S.C. § 119 to Korean Application No. 10-2015-0010412 filed on Jan. 22, 2015, whose entire disclosure is hereby incorporated by reference.

BACKGROUND

1. Field

The present disclosure relates to a BLDC motor and a cleaner having the same.

2. Background

A Blushless Direct Current (BLDC) motor is a type of a DC motor and is a motor not requiring a brush, as a rotor includes a magnet. The BLDC motor generates less noise and appropriate for a high speed rotation. When the BLDC motor is applied to a cleaner, the cleaner can rotate an impeller that sucks air to a dust collection unit in a high speed.

BRIEF DESCRIPTION OF THE DRAWINGS

Embodiments will be described in detail with reference to the following drawings in which like reference numerals refer to like elements, and wherein.

DETAILED DESCRIPTION

Figure 1:
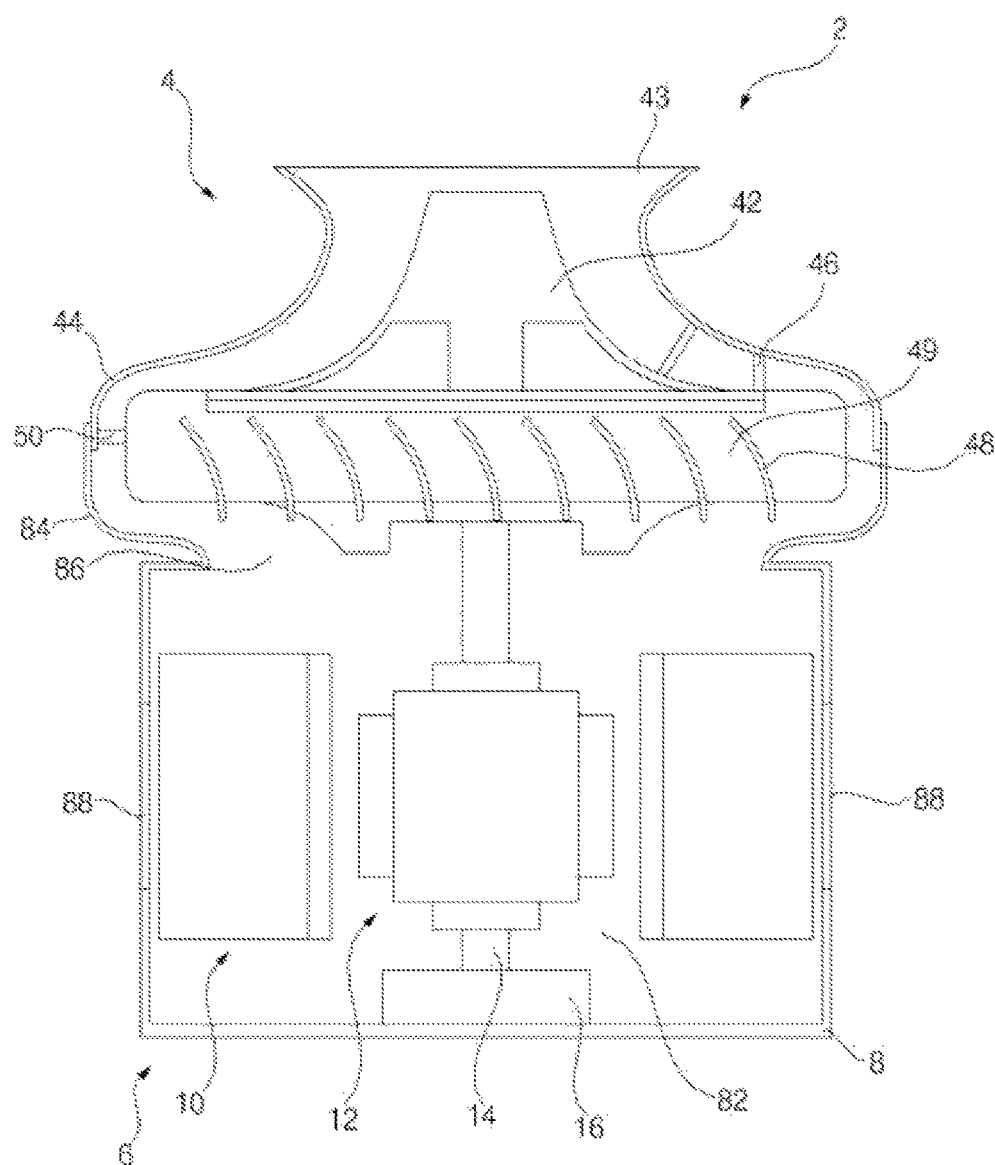
FIG. 1 is a cross-sectional view illustrating a fan motor assembly of a cleaner according to an exemplary embodiment of the present disclosure.

As illustrated in FIG. 1, a cleaner having a BLDC motor includes a fan motor assembly 2 that sucks air. The fan motor assembly 2 may include a fan 4 and a BLDC motor 6 that rotates the fan 4. The cleaner includes a collection unit (not shown) that collects a foreign substance from air moved by the fan motor assembly 2. The collection unit may be installed before the fan motor assembly 2 in an air movement direction. The collection unit may be a dust collection chamber or a cyclone dust collection chamber.

The fan 4 includes an impeller cover 44 in which an air inlet 43 is formed, and an impeller 42 disposed within the impeller cover 44 to move air. The impeller 42 includes a plurality of blades, and the blades may be curvedly formed in a circumference direction. When the impeller 42 rotates, air is inhaled into the air inlet 43 and is discharged in a radial direction of the impeller 42. The impeller 42 is installed with a shaft 14. The shaft 14 rotates by activation of the BLDC motor 6, and the impeller 42 rotates together with the shaft 14. In the impeller cover 44, an air inlet 43 is formed. At the opposite side of the air inlet 43, the BLDC motor 6 is provided, and the impeller cover 44 may be coupled to a motor housing 8 of the BLDC motor 6.

The fan 4 may further include a diffuser 46 that transfers air discharged through an outlet of the impeller 42 and a guide vane 48 that guides air transferred by the diffuser 46 to the inside of the motor. The diffuser 46 may be located at an outer circumference of the impeller 42. While air moved by the impeller 42 is transferred by the diffuser 46, velocity energy thereof may be converted to pressure energy. The guide vane 48 may be located between the diffuser 46 and the BLDC motor 6. The guide vane 48 guides air to the BLDC motor 6.

The fan 4 may further include a circular plate 49, and the circular plate 49 is fixed by a coupler 50. The coupler 50 may be coupled to at least one of the impeller cover 44 and the motor housing 8. The guide vane 48 may be formed at an outer circumference of the circular plate 49.

The BLDC motor 6 may be formed in three-phase, double-pole, and three-slots. The BLDC motor 6 includes a motor housing 8, a stator 10, and a rotor 12. The BLDC motor 6 is installed in the motor housing 8 and may further include a bearing 16 that supports the shaft 14.

The motor housing 8 includes an opening portion or an opening 86 that receives air moved from the fan 4 and an air outlet 88 that discharges air injected through the opening portion 86. In the motor housing 8, an impeller cover coupler 84 coupled to the impeller cover 44 may be formed. At the inside of the impeller cover coupler 84, the opening portion 86 is formed. Any one of the impeller cover coupler 84 and the impeller cover 44 may be inserted into the other one thereof. The impeller cover coupler 84 and the impeller cover 44 may be coupled by a fastening member such a screw and may be coupled by a latching means such as a hook.

The BLDC motor 6 may be heat released or cooled by air sent from the fan 4. At one surface of the motor housing 8, the opening portion 86 is formed, and air sent from the fan 4 is injected into the motor housing 8 through the opening portion 86. The motor housing 8 may include an air outlet 88 that discharges air that cools the inside of the BLDC motor 6 to the outside. The air outlet 88 may be formed in a side portion of the motor housing 8. Unlike the present exemplary embodiment, the air outlet 88 may be formed at the opposite side of the opening portion 86 based on the motor housing 8.

Figure 2:
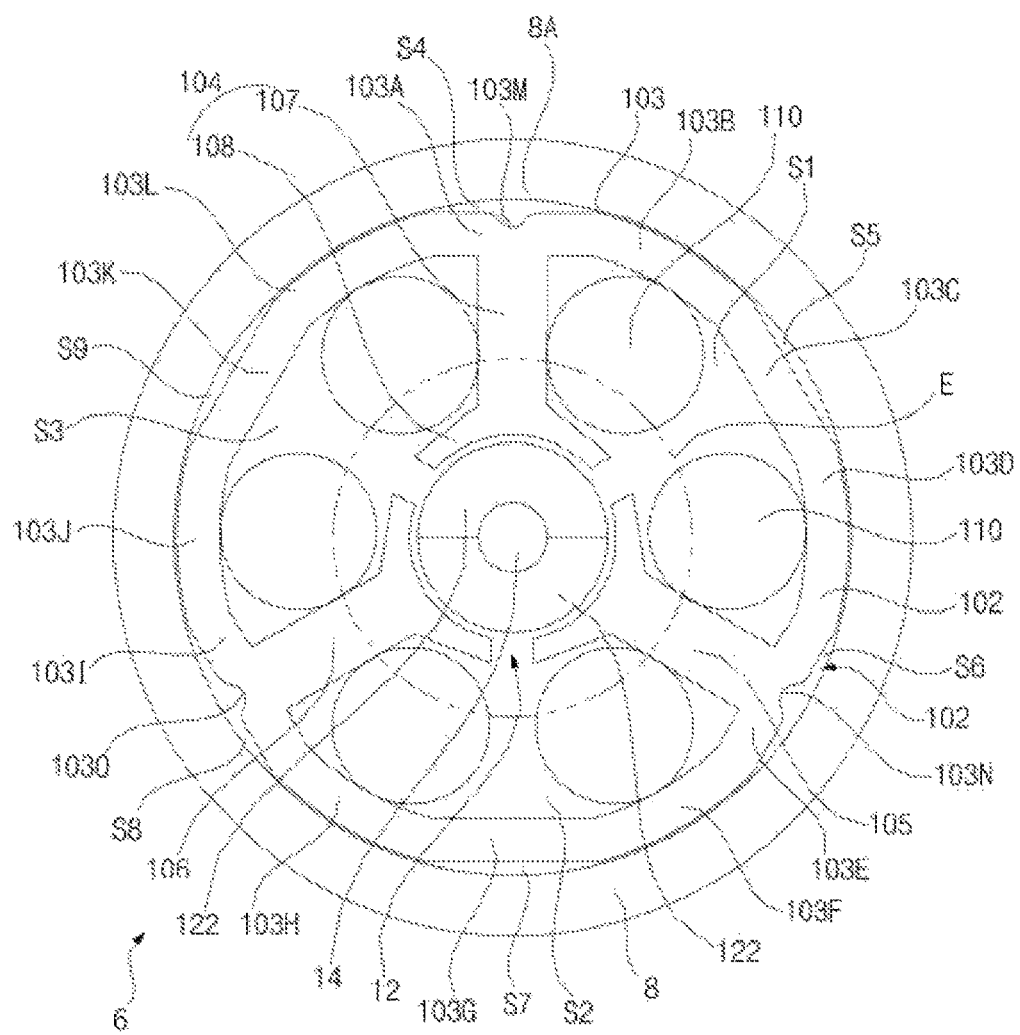
FIG. 2 is a top plan view of a BLDC motor of FIG. 1.
Figure 3:
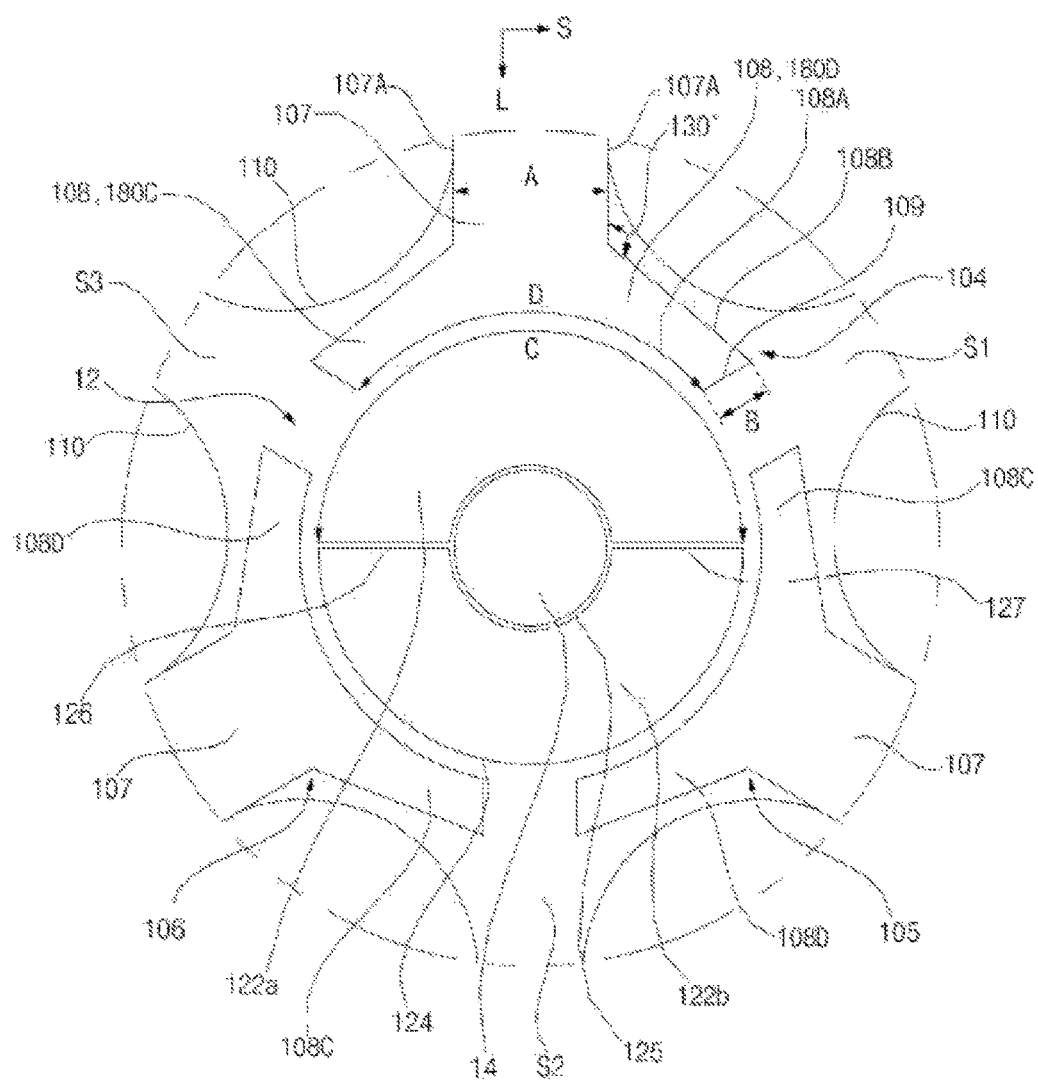
FIG. 3 is an enlarged view of a portion E of FIG. 2.
Figure 4:
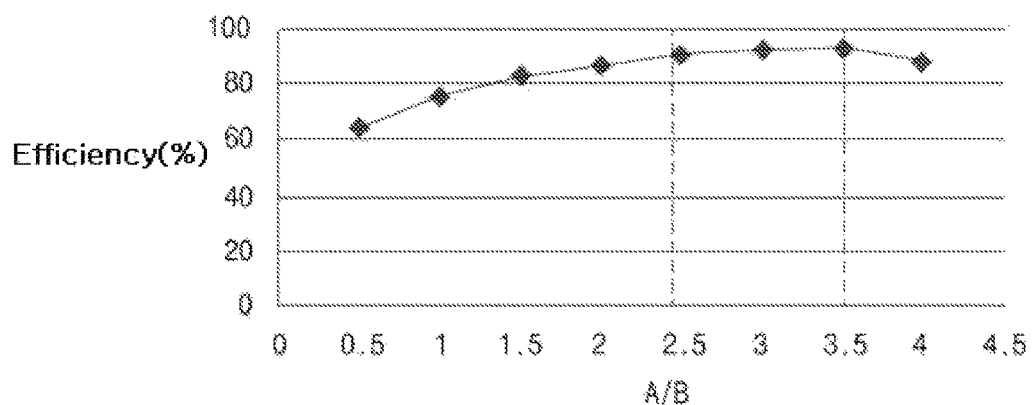
FIG. 4 is a graph illustrating efficiency according to a ratio of a width of a neck to a height of a shoe end portion of a BLDC motor according to an exemplary embodiment of the present disclosure.
Figure 5:
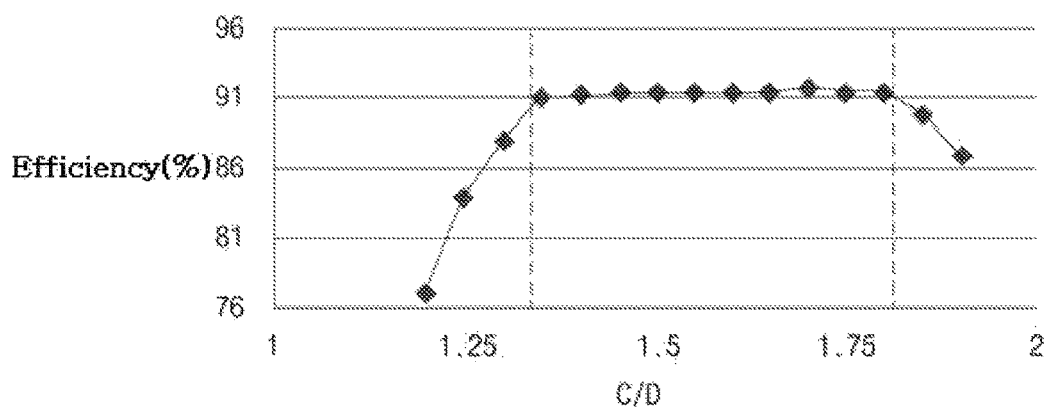
FIG. 5 is a graph illustrating efficiency according to a ratio of a pole pitch of a magnet to an internal arc length of a tooth of a BLDC motor according to an exemplary embodiment of the present disclosure.

FIG. 2 is a top plan view of a BLDC motor of FIG. 1, FIG. 3 is an enlarged view of a portion E of FIG. 2, FIG. 4 is a graph illustrating efficiency according to a ratio of a width of a neck to a height of a shoe end portion of a BLDC motor according to an exemplary embodiment of the present disclosure, and FIG. 5 is a graph illustrating efficiency according to a ratio of a pole pitch of a magnet to an internal arc length of tooth of a BLDC motor according to an exemplary embodiment of the present disclosure.

The stator 10 may include a stator core 102 installed in the motor housing 8 and a coil 110 wound in the stator core 102. In the coil 110, a three-phase coil may be wound. The rotor 12 includes a magnet 122 installed on the shaft 14. The magnet 122 may be provided to enclose the shaft 14. The magnet 122 may have a ring shape when viewed two-dimensionally. The magnet 122 is formed to enclose an outer circumference of the shaft 14.

The magnet 122 may be formed in the plural. At a periphery of the shaft 14, two to twelve magnets 122 may be disposed. A plurality of magnets 122 may be disposed to enclose along an outer circumferential surface of the shaft 14. In the present exemplary embodiment, the rotor 12 is produced in a divided structure in which each magnet 122 is installed in each area divided in a predetermined angle in a circumferential direction of the shaft 14. The magnet 122 may be installed to enclose the entire of an outer circumferential surface of the shaft 14.

In the present exemplary embodiment, two magnets 122 are disclosed. The magnet 122 is formed with a first magnet 122a and a second magnet 122b. The first magnet 122a is disposed to enclose a portion of an outer circumferential surface of the shaft 14, and the second magnet 122b is disposed to enclose the remaining portion of an outer circumferential surface of the shaft 14.

At an inner side surface of the first magnet 122a and the second magnet 122b facing the shaft 14, a half-circular groove is formed. A plurality of magnets 122 may enclose an outer circumference of the shaft 14.

An outer circumference 124 of the first magnet 122a may be formed in an arc shape, and an inner circumference 125 of the first magnet 122a may be also formed in an arc shape. The outer circumference 124 of the second magnet 122b may be formed in an arc shape, and the inner circumference 125 of the second magnet 122b may be also formed in an arc shape.

End portions or ends 126 and 127 that connect the inner circumference 125 and the outer circumference 124 of the first magnet 122a may be formed in a straight line shape. End portions 126 and 127 that connect the inner circumference 125 and the outer circumference 124 of the second magnet 122b may be formed in a straight line shape. An outer circumference length of the first magnet 122a or the second magnet 122b that connects the end portions 126 and 127 is defined to as a pole pitch C.

The first magnet 122a and the second magnet 122b each may be bonded and fixed to an outer circumferential surface of the shaft 14. The shaft 14 is connected to a rotation central axis of the impeller 42 of FIG. 1. The shaft 14 may rotate together with the magnet 122 and rotate the impeller 42.

The BLDC motor 6 may change a heat releasing performance and may also change motor efficiency according to a shape of the stator core 102. The stator core 102 may be formed in a shape that can effectively release a heat of the coil 110 and that can minimize iron loss. The stator core 102 is installed within the motor housing 8.

The stator core 102 may include a back yoke 103 and a plurality of teeth 104, 105, and 106 protruded from the back yoke 103. The back yoke 103 may contact an inner side surface of the motor housing 8. The teeth 104, 105, and 106 are protruded from the back yoke 103 toward the magnet 122. Teeth spaces S1, S2, and S3 are formed between the teeth 104, 105, and 106.

A back yoke space may be formed between the back yoke 103 and the motor housing 8. In the back yoke 103, straight portions 103A, 103C, 103E, 103G, 103I, and 103K and curved portions 103B, 103D, 103F, 103H, 103J, and 103L may be alternately formed.

The back yoke space is formed between the straight portions 103A, 103C, 103E, 103G, 103I, and 103K and the motor housing 8. Back yoke spaces S4, S5, S6, S7, S8, and S9 may be formed between an outer circumference of the straight portions 103A, 103C, 103E, 103G, 103I, and 103K and an inner circumference surface 8A of the motor housing 8.

An outer circumference of the curved portions 103B, 103D, 103F, 103H, 103J, and 103L may contact the inner circumference surface 8A of the motor housing 8. The curved portions 103B, 103D, 103F, 103H, 103J, and 103L may contact with at an inner side surface of the motor housing 8.

An area of the teeth spaces S1, S2, and S3 may change according to the number of straight portions and the number of curved portions constituting the stator core 102. In the stator core 102, an area of the back yoke spaces S4, S5, S6, S7, S8, and S9 formed between an outer circumference of the back yoke 103 and an inner circumference 8A of the motor housing 8 may change according to the number of straight portions and the number of curved portions.

As the number of straight portions and the number of curved portions decrease, an area of the back yoke spaces S4, S5, S6, S7, S8, and S9 increases, and an area of the teeth spaces S1, S2, and S3 between a plurality of teeth 104, 105, and 106 may reduce. In contrast, as the number of straight portions and the number of curved portions increase, an area of the back yoke spaces S4, S5, S6, S7, S8, and S9 may reduce and an area of the teeth spaces S1, S2, and S3 between a plurality of teeth 104, 105, and 106 may increase.

The back yoke spaces S4, S5, S6, S7, S8, and S9 and the teeth spaces S1, S2, and S3 are inversely proportional. When increasing the teeth spaces S1, S2, and S3 by reducing the back yoke spaces S4, S5, S6, S7, S8, and S9, an area that can wind the coil 110 may increase. As the teeth spaces S1, S2, and S3 increase, a heat releasing performance of the coil 110 may increase.

The term "area" is used to described the size of the spaces S1, S2, S3, S4, S5, S6, S7, S8 and S9, rather than the term "volumn". FIG. 2 and FIG. 3 illustrate the two dimensional view, and the height of the spaces are substantially the same. As can be appreciated, an increase in cross-sectional area corresponds to an increase in volumn of the spaces.

In the present exemplary embodiment, the straight portions 103A, 103C, 103E, 103G, 103I, and 103K and the curved portions 103B, 103D, 103F, 103H, 103J, and 103L of the back yoke 103 are each provided with 6 pieces. In this case, while straight portions and curved portions of the back yoke 103 are alternatively formed, an entire shape thereof may be formed adjacent to a ring shape and may increase the teeth spaces S1, S2, and S3.

In the present exemplary embodiment, three teeth are provided. The respective teeth 104, 105, and 106 are formed from the back yoke 103 toward the magnet 122. The respective teeth 104, 105, and 106 may be protruded toward an inner side surface magnet 122 of the back yoke 103. The respective teeth 104, 105, and 106 may be protruded from the straight portions 103A, 103E, and 103I of the back yoke 103. A straight portion in which the teeth are protruded is defined to a teeth straight portion.

The back yoke 103 may further include external grooves 103M, 103N, and 103O formed at an outer circumference of the teeth straight portions 103A, 103E, and 103I. At an inner side surface of the teeth straight portions 103A, 103E, and 103I, the teeth 104, 105, and 106 are formed, and at an outer side surface thereof, the external grooves 103M, 103N, and 103O are formed.

The external grooves 103M, 103N, and 103O may be concavely depressed. The external grooves 103M, 103N, and 103O are concavely depressed toward the shaft 14 or the magnet 122. A welding material may be housed in the external grooves 103M 103N 103O, and the stator core 102 and the motor housing 8 may be bonded through the welding material.

A plurality of teeth 104, 105, and 106 may be formed in an equal interval in the back yoke 103. The plurality of teeth 104, 105, and 106 may be radially disposed about the shaft 14. The plurality of teeth 104, 105, and 106 may be disposed in an equal interval about the shaft 14.

The teeth includes first tooth 104, second tooth 105, and third tooth 106. The first teeth space S1 is formed between the first tooth 104 and the second tooth 105. The second teeth space S2 is formed between the second tooth 105 and the third tooth 106. The third teeth space S3 is formed between the third tooth 106 and the first tooth 104.

As an area of the teeth spaces S1, S2, and S3 increases, an area, an amount, and the number of the coil 110 that can be wound may increase. As an area of the teeth spaces S1, S2, and S3 increases, a distance of the wound coil 110 may be further separated or increased. As an area of the teeth spaces S1, S2, and S3 increases, movement resistance of air reduces or amount of movement of air increases, thereby improving a heat releasing performance. In the present exemplary embodiment, the BLDC motor 6 is a three-slot BLDC motor. The three teeth 104, 105, and 106 may maximize a heat releasing performance and maximize the wound coil 110.

A plurality of teeth 104, 105, and 106 may be formed in the same shape and the same size. The plurality of teeth 104, 105, and 106 each include a neck 107 protruded from the back yoke 103 toward the magnet 122 and a shoe 108 protruded from the neck 107 to surround a portion of the magnet 122.

A direction in which the neck 107 is protruded from the back yoke 103 toward the magnet 122 may be a long direction L. The long direction L may be a radial direction based on the shaft 14. The neck 107 may be orthogonal to an inner side surface of the back yoke 103. A direction orthogonal to the long direction L is defined to a short direction S. The neck 107 may have a constant width in the long direction L. The neck 107 may include two parallel side surfaces 107A, and a width A of the neck 107 may be a distance between the two side surfaces 107A.

Two shoes 108 may be protruded from one neck 107. A shoe protruded from the neck 107 to one side is defined to a first shoe 108C, and a shoe protruded from the neck 107 to the other side is defined to a second shoe 108D. The first shoe 108C and the second shoe 108D may be symmetrically formed based on the neck 107. The respective shoes 108 are disposed around the magnet 122. The respective shoes 108 are separated by a predetermined gap from the magnet 122. The first shoe 108C and the second shoe 108D may be formed in an arc shape.

An end portion 109 formed at the end of the shoe 108 may be the free end. The end portion 109 may be disposed opposite to the shoe 108 of adjacent tooth. The shoe 108 includes a shoe inner side surface 108A disposed toward the magnet 122 and a shoe outer side surface 108B disposed toward the back yoke 103.

The shoe inner side surface 108A is separated by a predetermined gap from the magnet 122 and is formed opposite to the magnet 122. The shoe outer side surface 108B is located at the opposite side of the shoe inner side surface 108A and is formed opposite to an inner side surface of the back yoke 103.

The shoe inner side surface 108A may have an arc shape corresponding to an outer circumference of the magnet 122. A length of the shoe inner side surface 108A is defined to an arc length D. The arc length D may be a length that connects an end portion 109 of the first shoe and an end portion 109 of the second shoe.

A length of the magnet 122 opposite to the shoe inner side surface 108A is defined to a pole pitch C. The magnet 122 is formed with a first magnet 122a and a second magnet 122b, and the pole pitch C may be an outer circumference length of the first magnet 122a or the second magnet 122b. In the present exemplary embodiment, because the first magnet 122a and the second magnet 122b are symmetric, pole pitches C thereof are the same. In an alternative embodiment, pole pitches C of the first magnet 122a and the second magnet 122b may be different.

In the present exemplary embodiment, the pole pitch C is a length of the outer circumference 124 that connects the end portions 126 and 127 from the first magnet 122a or the second magnet 122b. The shoe outer side surface 108B may form an angle of 130° from the side surface 107A of the neck 107. The shoe outer side surface 108B may form an angle of 130° from the long direction L. The angle may be an angle from a protrusion direction of the shoe instead of the shoe outer side surface.

An area and shape of the teeth spaces S1, S2, and S3 may change according to a width A of the neck 107 and a width B of the end portion 109 of the shoe 108. A width A of the neck 107 may be a width of the short direction S. A width B of the end portion 109 may be a length located at the outermost side among lengths between the shoe inner side surface 108A and the shoe outer side surface 108B.

In the present exemplary embodiment, an end portion of a second shoe 108D of the first tooth 104 and an end portion of a first shoe 108C of the second tooth 105 are formed opposite. An end portion of the second shoe 108D of the second tooth 105 and an end portion of the first shoe 108C of the third tooth 106 are formed opposite. An end portion of a second shoe 108D of the third tooth 106 and an end portion of a first shoe 108C of the first tooth 104 are formed opposite.

When viewed two-dimensionally, the first teeth space S1 is opened only between the second shoe 108D of the first tooth 104 and the first shoe 108C of the second tooth 105. When viewed two-dimensionally, the second tooth space S2 is opened only between the second shoe 108D of the second tooth 105 and the first shoe 108C of the third tooth 106. When viewed two-dimensionally, the third tooth space S3 is opened only between the second shoe 108D of the third tooth 106 and the first shoe 108C of the first tooth 104.

The first teeth space S1 is formed between the first tooth 104 and the second tooth 105. The second teeth space S2 is formed between the second tooth 105 and the third tooth 106. The third teeth space S3 is formed between the third tooth 106 and the first tooth 104.

A coil wound in the first tooth 104 is disposed over the third teeth space S3 and the first teeth space S1. A coil wound in the second tooth 105 is disposed over the first teeth space S1 and the second teeth space S2. A coil wound in the third tooth 106 is disposed over the second teeth space S2 and the third teeth space S3.

FIG. 4 is a graph illustrating efficiency of a three-phase, double-pole, and three-slot BLDC motor in which the respective number of straight portions and curved portions of a back yoke is six, as in the present exemplary embodiment. FIG. 4 illustrates a graph measured in a condition different only in a ratio A/B of a width A of the neck 107 to an end portion width B of the shoe 108 and in which the entire of other conditions is the same.

As shown in FIG. 4, when the ratio A/B is 2.5 to 3.5, it may be determined that the BLDC motor may have high efficiency. A ratio A/B of a width A of the neck 107 to a width B of an end portion 109 of the shoe 108 is 2.5 to 3.5 has a higher efficiency range. Until the ratio A/B increases to 3.5, it may be determined that efficiency may gradually improve. It may be determined that it is positive in efficiency to increase a width A of the end portion 109 rather than a length thereof.

The ratio A/B is obtained based on one shoe to one neck. When the shoe is formed with the first shoe 108C and the second shoe 108D, as in the present exemplary embodiment, the ratio A/B may be different. That is, a ratio A/B of a width A of the neck to a width B of an end portion of the first shoe may be 2.5 to 3.5. Only a ratio A/B of a width A of the neck to a width B of the end portion of the second shoe may be 2.5 to 3.5. In the present exemplary embodiment, a ratio A/B of a width A of the neck to a width B of the end portion of the first shoe is 2.5 to 3.5, and a ratio A/B of a width A of the neck and a width B of the end portion of the second shoe is also 2.5 to 3.5.

FIG. 5 is a graph illustrating efficiency of a three-phase, double-pole, and three-slot BLDC motor in which the respective number of straight portions and curved portions of a back yoke is six, as in the present exemplary embodiment. FIG. 5 illustrates a graph measured in a condition different only in a ratio C/D of a pole pitch C of the magnet 122 to an internal arc length D of the teeth 104, 105, and 106 and in which the entire of other conditions is the same.

In the present exemplary embodiment, because two magnets 122 are installed, a pole pitch C may be a half of an outer circumference length of the magnet 122. The pole pitch C may be an outer circumference length of the first magnet 122a or the second magnet 122b. An internal arc length D of the teeth 104, 105, and 106 may be a length of the shoe inner side surface 108A. The arc length D may be a length of the shoe inner side surface 108A that connects two shoes 108.

Referring to FIG. 5, a ratio C/D of the pole pitch C to the internal arc length D may be 1.35 to 1.8. In the graph, when the ratio D/C is 1.35 to 1.8, it may be determined that the BLDC motor has high efficiency. Efficiency of a three-phase, double-pole, and three-slot BLDC motor of FIG. 5 is efficiency measured when a ratio A/B of a width A of the neck to a width B of the shoe end portion is 3.

Referring to FIGS. 4 and 5, when a ratio A/B of a width A of the neck to a width B of the shoe end portion is 2.5 to 3.5 and when a ratio C/D of a pole pitch C of a magnet to an internal arc length D of tooth is 1.35 to 1.8, efficiency of the BLDC motor 6 according to the present exemplary embodiment can be maximized. As can be seen in the graph, when the ratio A/B is 2.5 to 3.5 and when the ratio C/D is 1.35 to 1.8, the BLDC motor represents efficiency of approximately 90% or more.

The present disclosure teaches a BLDC motor having a high heat releasing performance and a cleaner having the same. The present disclosure further provides a BLDC motor having high efficiency and a cleaner having the same.

In accordance with an aspect of the present disclosure, a Blushless Direct Current (BLDC) motor may include: a motor housing; a stator including a stator core installed within the motor housing and a coil wound in the stator core and that generates a magnetic field by applied power; and a rotor disposed within the stator and in which a magnet that interacts with the magnetic field is installed and that rotates within the stator by an interaction with the magnetic field, wherein the stator core includes: a back yoke in which straight portions and curved portions are alternately formed; and teeth protruded from the back yoke toward the magnet, wherein the teeth include: a neck protruded from the back yoke; and a shoe protruded from the neck and separated from the magnet and that encloses at least a portion of the magnet, wherein a ratio A/B of a width A of the neck to a width B of a shoe end portion is 2.5 to 3.5.

The shoe may include: a first shoe protruded to one side of the neck; and a second shoe protruded to the other side of the neck, wherein a ratio C/D of a pole pitch C to an internal arc length D may be 1.35 to 1.8, when an outer circumference length of the magnet is a pole pitch C and when a length that connects an end portion of the first shoe and an end portion of the second shoe is an internal arc length D.

The rotor may include a shaft, and the magnet may be formed with a first magnet and a second magnet that enclose the shaft, and the pole pitch C may be an outer circumference length of any one of the first magnet or the second magnet.

The rotor may include a shaft, and the magnet may be formed with a first magnet and a second magnet that enclose the shaft, and the teeth may be formed with first teeth, second teeth, and third teeth and may be radially disposed about the shaft.

The first teeth, the second teeth, and the third teeth may be disposed with an equal interval.

In the back yoke, straight portions and curved portions are alternately disposed, and six straight portions are disposed and six curved portions are disposed, and the first teeth, the second teeth, and the third teeth may each be protruded from three straight portions among the six straight portions.

The first teeth, the second teeth, and the third teeth may be disposed with an equal interval about the shaft.

At an outer circumference of the straight portion, a concavely depressed external groove may be formed.

A first teeth space S1 may be formed between the first teeth and the second teeth, a second teeth space S2 may be formed between the second teeth and the third teeth, and a third teeth space S3 may be formed between the third teeth and the first teeth, and each back yoke space may be formed between the each straight portion and the motor housing.

An angle between a side surface of the neck and an outer side surface of the shoe may be 130°.

The rotor may include a shaft, and the magnet may be formed with a first magnet and a second magnet that enclose the shaft, in the back yoke, straight portions and curved portions may be alternately disposed, six straight portions may be disposed, and six curved portions may be disposed, the teeth may be formed with first teeth, second teeth, and third teeth and may be radially disposed about the shaft, and the first teeth, the second teeth, and the third teeth may each be protruded from three straight portions among the six straight portions, and the coil may be wound at a neck of the first teeth, a neck of the second teeth, and a neck of the third teeth.

The shoe may include: a first shoe protruded to one side of the neck; and a second shoe protruded to the other side of the neck, wherein a ratio C/D of a pole pitch C to an internal arc length D may be 1.35 to 1.8, when an outer circumference length of the first magnet or the second magnet is a pole pitch C and when a length that connects an end portion of the first shoe and an end portion of the second shoe is an internal arc length D.

An angle between a side surface of the neck and an outer side surface of the first shoe and an angle between a side surface of the neck and an outer side surface of the second shoe may each be 130°.

A first teeth space S1 may be formed between the first teeth and the second teeth, a second teeth space S2 may be formed between the second teeth and the third teeth, and a third teeth space S3 may be formed between the third teeth and the first teeth, and a coil wound in the first teeth may be disposed over the third teeth space S3 and the first teeth space S1, a coil wound in the second teeth may be disposed over the first teeth space S1 and the second teeth space S2, and a coil wound in the third teeth may be disposed over the second teeth space S2 and the third teeth space S3.

A second shoe end portion of the first teeth and a first shoe end portion of the second teeth may be formed opposite, a second shoe end portion of the second teeth and a first shoe end portion of the third teeth may be formed opposite, and a second shoe end portion of the third teeth and a first shoe end portion of the first teeth may be formed opposite.

A ratio A/B of a width A of the neck to a width B of a first shoe end portion may be 2.5 to 3.5, and a ratio A/B of a width A of the neck to a width B of a second shoe end portion may be 2.5 to 3.5.

In accordance with an aspect of the present disclosure, a cleaner may include: a Blushless Direct Current (BLDC) motor having a shaft; an impeller installed in the shaft; and an impeller cover that encloses the impeller and that guides air moved by the impeller to the inside of the BLDC motor, wherein the BLDC motor includes: a motor housing; a stator including a stator core installed within the motor housing and a coil wound in the stator core and that generates a magnetic field by applied power; and a rotor located within the stator and in which a first magnet and a second magnet installed in the shaft to interact with the magnetic field are installed and that rotates within the stator by interaction with the magnetic field, wherein the stator core includes: a back yoke in which straight portions and curved portions are alternately formed and having six straight portions; and first teeth, second teeth, and third teeth each protruded from three straight portions among the six straight portions toward the magnet, wherein the each teeth include: a neck protruded from the back yoke; a first shoe protruded from the neck and that encloses at least a portion of the magnet and disposed opposite to the magnet and protruded to one side of the neck; and a second shoe protruded to the other side of the neck, wherein a ratio C/D of a pole pitch C to an internal arc length D is 1.35 to 1.8, when an outer circumference length of the first magnet or the second magnet is a pole pitch C and when a length that connects an end portion of the first shoe and an end portion of the second shoe is an internal arc length D, and a ratio A/B of a width A of the neck to a width B of the first shoe end portion is 2.5 to 3.5 or a ratio A/B of a width A of the neck to a width B of the second shoe end portion is 2.5 to 3.5.

An angle between a side surface of the neck and an outer side surface of the first shoe may be 130° or an angle between a side surface of the neck and an outer side surface of the second shoe may be 130°.

A ratio A/B of a width A of the neck to a width B of the first shoe end portion may be 3, and a ratio A/B of a width A of the neck to a width B of the second shoe end portion may be 3.

A second shoe end portion of the first teeth and a first shoe end portion of the second teeth may be formed opposite, a second shoe end portion of the second teeth and a first shoe end portion of the third teeth may be formed opposite, and a second shoe end portion of the third teeth and a first shoe end portion of the first teeth may be formed opposite.

The present disclosure may have various advantages. For example, because teeth spaces S1, S2, and S3 in which a coil is wound are widely formed, a heat releasing performance through the teeth space may be improved. Further, by optimizing a ratio A/B of a width A of a neck to a width B of a shoe end portion constituting a stator core, efficiency of a BLDC motor may be maximized.

By optimizing a ratio C/D of a pole pitch C, which is an outer circumference length of a magnet to an internal arc length D of a shoe constituting a stator core, efficiency of a BLDC motor may be maximized. By optimizing an angle between the neck and the shoe, efficiency of a BLDC motor may be maximized. By optimizing a location of a wound coil, efficiency of a BLDC motor can be maximized.

By optimizing a shape, direction, and location of each shoe that encloses a first magnet and a second magnet, a teeth space can be maximized. By optimizing a shape of a neck, a first shoe, and a second shoe constituting teeth, movement resistance of air can be minimized and a heat releasing performance can be maximized.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A Blushless Direct Current (BLDC) motor, comprising:
a motor housing;
a stator having a stator core provided within the motor housing and a coil wound in the stator core to generate a magnetic field based on applied power; and
a rotor surrounded by the stator and having a magnet that interacts with the magnetic field to rotate within the stator,
wherein the stator core comprises:
a back yoke having straight portions and curved portions that are alternately formed; and
teeth protruded from the back yoke toward the magnet, wherein at least one the teeth includes:
a neck protruding from the back yoke, and
a shoe protruding from the neck and separated from the magnet, the shoes surrounding at least a portion of the magnet,
wherein a ratio A/B of a width A of the neck to a width B of a shoe end portion is in a range between 2.5 and 3.5.

2. The BLDC motor of claim 1, wherein the shoe comprises:
a first shoe protruding from one side of the neck; and
a second shoe protruding from the other side of the neck,
wherein a ratio C/D of a pole pitch C to an internal arc length D is 1.35 to 1.8, where an outer circumference length of the magnet is a pole pitch C and a length that connects an end portion of the first shoe and an end portion of the second shoe is an internal arc length D.

3. The BLDC motor of claim 2, wherein the rotor includes a shaft, the magnet includes a first magnet and a second magnet coupled to the shaft, wherein the pole pitch C is an outer circumference length of one of the first magnet and the second magnet.

4. The BLDC motor of claim 1, wherein
the rotor includes a shaft, and the magnet includes a first magnet and a second magnet coupled to the shaft, and
the teeth includes first tooth, second tooth, and third tooth radially disposed about the shaft.

5. The BLDC motor of claim 4, wherein the first tooth, the second tooth, and the third tooth are disposed about at an equal interval.

6. The BLDC motor of claim 4, wherein straight portions include six straight portions and the curved portions include six curved portions, and first tooth, second tooth, and third tooth are each protruding from corresponding three straight portions among the six straight portions.

7. The BLDC motor of claim 6, wherein the first tooth, the second tooth, and the third tooth are disposed about at an equal interval around the shaft.

8. The BLDC motor of claim 6, wherein an outer circumference of each of the three straight portions includes a concavely depressed external groove.

9. The BLDC motor of claim 6, wherein
a first teeth space S1 is formed between the first tooth and the second tooth, a second teeth space S2 is formed between the second tooth and the third tooth, and a third teeth space S3 is formed between the third tooth and the first tooth, and
each back yoke space is formed between the each of the straight portions and the motor housing.

10. The BLDC motor of claim 1, wherein an angle between a side surface of the neck and an outer side surface of the shoe is 130°.

11. The BLDC motor of claim 1, wherein
the rotor includes a shaft, and the magnet includes a first magnet and a second magnet coupled to the shaft,
the straight portions include six straight portions, and the curved portions include six curved portions,
the teeth include first tooth, second tooth, and third tooth and are radially disposed about the shaft, and the first tooth, the second tooth, and the third tooth protrude from three straight portions among the six straight portions, and
the coil is wound at a neck of the first tooth, a neck of the second tooth, and a neck of the third tooth.

12. The BLDC motor of claim 11, wherein the shoe comprises:
a first shoe protruding from one side of the neck; and
a second shoe protruding from the other side of the neck,
wherein a ratio C/D of a pole pitch C to an internal arc length D is 1.35 to 1.8, where an outer circumference length of the first magnet or the second magnet is a pole pitch C and a length that connects an end portion of the first shoe and an end portion of the second shoe is an internal arc length D.

13. The BLDC motor of claim 12, wherein an angle between a side surface of the neck and an outer side surface of the first shoe and an angle between a side surface of the neck and an outer side surface of the second shoe each are 130°.

14. The BLDC motor of claim 12, wherein
a first teeth space S1 is formed between the first tooth and the second tooth, a second teeth space S2 is formed between the second tooth and the third tooth, and a third teeth space S3 is formed between the third tooth and the first tooth, and
a first coil of the first tooth is disposed in the third teeth space S3 and the first teeth space S1, a second coil of the second tooth is disposed in the first teeth space S1 and the second teeth space S2, and a third coil of the third tooth is disposed in the second teeth space S2 and the third teeth space S3.

15. The BLDC motor of claim 12, wherein
a second shoe end portion of the first tooth and a first shoe end portion of the second tooth face each other,
a second shoe end portion of the second tooth and a first shoe end portion of the third tooth face each other, and
a second shoe end portion of the third tooth and a first shoe end portion of the first tooth face each other.

16. The BLDC motor of claim 2, wherein a ratio A/B of a width A of the neck to a width B of the first shoe end portion is 2.5 to 3.5, and a ratio A/B of a width A of the neck to a width B of the second shoe end portion is 2.5 to 3.5.

17. A cleaner comprises:
a Blushless Direct Current (BLDC) motor having a shaft;
an impeller installed on the shaft; and
an impeller cover enclosing the impeller and guiding air moved by the impeller to the inside of the BLDC motor,
wherein the BLDC motor comprises:
a motor housing;
a stator having a stator core provided within the motor housing and a coil wound in the stator core to generate a magnetic field based on applied power; and
a rotor surrounded by the stator and having a first magnet and a second magnet coupled the shaft to interact with the magnetic field to rotate within the stator,
wherein the stator core comprises:
a back yoke having straight portions and curved portions that are alternately formed and having six straight portions; and
first tooth, second tooth, and third tooth each protruding from three straight portions among the six straight portions toward the magnet,
wherein the each tooth comprise:
a neck protruding from the back yoke;
a first shoe provided adjacent to the magnet, the first shoe protruding from the neck to enclose at least a portion of the magnet and protruding from one side of the neck; and
a second shoe protruding from the other side of the neck,
wherein a ratio C/D of a pole pitch C to an internal arc length D is 1.35 to 1.8, where an outer circumference length of the first magnet or the second magnet is a pole pitch C and a length that connects an end portion of the first shoe and an end portion of the second shoe is an internal arc length D, and
a ratio A/B of a width A of the neck to a width B of the first shoe end portion is 2.5 to 3.5 or a ratio A/B of a width A of the neck to a width B of the second shoe end portion is 2.5 to 3.5.

18. The cleaner of claim 17, wherein an angle between a side surface of the neck and an outer side surface of the first shoe is 130° or an angle between a side surface of the neck and an outer side surface of the second shoe is 130°.

19. The cleaner of claim 17, wherein a ratio A/B of a width A of the neck to a width B of the first shoe end portion is 3, and a ratio A/B of a width A of the neck to a width B of the second shoe end portion is 3.

20. The cleaner of claim 17, wherein
a second shoe end portion of the first tooth and a first shoe end portion of the second tooth face each other,
a second shoe end portion of the second tooth and a first shoe end portion of the third tooth face each other, and
a second shoe end portion of the third tooth and a first shoe end portion of the first tooth face each other.

* * * * *